(12) United States Patent
Choi et al.

(10) Patent No.: US 9,148,890 B1
(45) Date of Patent: *Sep. 29, 2015

(54) SYSTEMS AND METHODS FOR SCHEDULING TRANSMISSION OF WIRELESS SIGNALS TO FACILITATE COEXISTENCE

(71) Applicant: Marvell International Ltd., Hamilton (BM)

(72) Inventors: Jihwan P. Choi, San Jose, CA (US); Ying Cai, Campbell, CA (US); Yakun Sun, Sunnyvale, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/570,104

(22) Filed: Dec. 15, 2014

Related U.S. Application Data

(63) Continuation of application No. 13/553,170, filed on Jul. 19, 2012, now Pat. No. 8,914,019.

(60) Provisional application No. 61/521,689, filed on Aug. 9, 2011.

(51) Int. Cl.
*H04W 72/12* (2009.01)
*H04W 72/08* (2009.01)
*H04W 72/04* (2009.01)
*H04W 88/06* (2009.01)

(52) U.S. Cl.
CPC ........ *H04W 72/1226* (2013.01); *H04W 72/048* (2013.01); *H04W 72/082* (2013.01); *H04W 88/06* (2013.01)

(58) Field of Classification Search
CPC ... H04W 24/00; H04W 4/00; H04W 72/1226; H04W 72/048
USPC ............... 455/423, 452.1, 67.11, 422.1, 63.3, 455/553.1, 552.1, 550.1, 426.1
See application file for complete search history.

(56) References Cited

U.S. PATENT DOCUMENTS

| 7,400,903 B2 * | 7/2008 | Shoemake et al. ......... 455/552.1 |
| 2007/0047625 A1 * | 3/2007 | Klomsdorf et al. ........... 375/141 |
| 2012/0213116 A1 * | 8/2012 | Koo et al. ..................... 370/253 |

* cited by examiner

*Primary Examiner* — John J Lee

(57) ABSTRACT

A device including a first transceiver and a second transceiver. The first transceiver is configured to selectively transmit and receive first signals in a first frequency band according to a schedule. The first signals include at least cellular signals. The second transceiver is configured to selectively transmit and receive second signals in a second frequency band different from the first frequency band. The second signals include at least WiFi signals. An arbiter is configured to generate status reports indicating statuses of channels in the first frequency band and/or the second frequency band, receive the schedule as generated based on the statuses, and selectively modify the status reports based on an expected transmission and/or reception of the first signals by the first transceiver, and/or an expected transmission and/or reception of the second signals by the second transceiver.

18 Claims, 3 Drawing Sheets

SYSTEMS AND METHODS FOR SCHEDULING TRANSMISSION OF WIRELESS SIGNALS TO FACILITATE COEXISTENCE

CROSS-REFERENCE TO RELATED APPLICATIONS

The present disclosure is a continuation of U.S. patent application Ser. No. 13/553,170 (now U.S. Pat. No. 8,914,019), filed on Jul. 19, 2012, which claims the benefit of U.S. Provisional Application No. 61/521,689, filed on Aug. 9, 2011. The entire disclosures of the applications referenced above are incorporated herein by reference.

FIELD

The present disclosure relates generally to the field of wireless communication. More particularly, the present disclosure relates to avoiding interference between different wireless communication technologies that use adjacent or overlapping frequency bands.

BACKGROUND

The popularity of multiple wireless communication technologies for handheld platforms has created a need to integrate wireless communication technologies on a single wireless communication device. However, the frequency bands of some of these technologies are close enough to result in interference. For example, the un-licensed 2.4 GHz Industrial, Scientific and Medical (ISM) frequency band is adjacent to some of the bands used by Mobile Wireless Standards (MWS) technologies to result in adjacent channel interference. In many electronic devices such as smartphones, both ISM and MWS technologies are implemented in the same device. For example, a smartphone may employ LTE (Long Term Evolution) for phone calls, WiFi for local area networking, and Bluetooth for headsets. LTE transmissions from the smartphone will cause adjacent channel interference with incoming Bluetooth and WiFi signals. Similarly, Bluetooth and WiFi transmissions from the smartphone will cause adjacent channel interference with incoming LTE signals. This adjacent channel interference can significantly degrade performance not only at the smartphone, but also at connected MWS base stations.

SUMMARY

In general, in one aspect, an embodiment features an apparatus comprising: a Mobile Wireless Standards (MWS) transceiver configured to transceive MWS signals in accordance with a schedule, wherein the schedule is based on link status reports transmitted by the MWS transceiver as part of the MWS signals; one or more Industrial, Scientific and Medical (ISM) band transceivers, wherein each ISM band transceiver is configured to transceive ISM band signals; and an arbiter configured to modify the link status reports, prior to transmission of the link status reports, based on at least one of i) an expected transmission of the ISM band signals by one of the ISM band transceivers, and ii) an expected reception of the ISM band signals by one of the ISM band transceivers.

Embodiments of the apparatus can include one or more of the following features. In some embodiments, the arbiter is further configured to modify the link status reports based on at least one of i) a priority of traffic carried by the MWS signals, and ii) a priority of traffic carried by the ISM band signals. In some embodiments, the link status reports include a channel condition value; and wherein the arbiter is further configured to modify the channel condition value in the link status reports based on the expected transmission of the ISM band signals by one of the ISM band transceivers. In some embodiments, the link status reports include a traffic demand value; and wherein the arbiter is further configured to modify the traffic demand value in the link status reports based on the expected reception of the ISM band signals by one of the ISM band transceivers. In some embodiments, the MWS transceiver comprises at least one of: a Long Term Evolution (LTE) transceiver; and a Worldwide Interoperability for Microwave Access (WiMAX) transceiver. In some embodiments, the one or more ISM band transceivers comprise at least one of: a WiFi transceiver; a Bluetooth transceiver; and a ZigBee transceiver. Some embodiments comprise one or more integrated circuits comprising the apparatus. Some embodiments comprise an electronic communication device comprising the apparatus.

In general, in one aspect, an embodiment features a method for an electronic device, the method comprising: transceiving Mobile Wireless Standards (MWS) signals in accordance with a schedule, wherein the schedule is based on link status reports; transmitting the link status reports as part of the MWS signals; transceiving Industrial, Scientific and Medical (ISM) band signals; and modifying the link status reports, prior to transmitting the link status reports, based on at least one of i) an expected transmission of the ISM band signals from the electronic device, and ii) an expected reception of the ISM band signals by the electronic device.

Embodiments of the method can include one or more of the following features. Some embodiments comprise modifying the link status reports based on at least one of i) a priority of traffic carried by the MWS signals, and ii) a priority of traffic carried by the ISM band signals. In some embodiments, the link status reports include a channel condition value; and the method further comprises modifying the channel condition value in the link status reports based on the expected transmission of the ISM band signals from the electronic device. In some embodiments, the link status reports include a traffic demand value; and the method further comprises modifying the traffic demand value in the link status reports based on the expected reception of the ISM band signals by the electronic device. In some embodiments, the MWS signals comprise at least one of: Long Term Evolution (LTE) signals; and Worldwide Interoperability for Microwave Access (WiMAX) signals. In some embodiments, the one or more ISM band signals comprise at least one of: WiFi signals; Bluetooth signals; and ZigBee signals.

In general, in one aspect, an embodiment features computer-readable media embodying instructions executable by a computer in an electronic device to perform functions comprising: transceiving Mobile Wireless Standards (MWS) signals in accordance with a schedule, wherein the schedule is based on link status reports; transmitting the link status reports as part of the MWS signals; transceiving Industrial, Scientific and Medical (ISM) band signals; and modifying the link status reports, prior to transmitting the link status reports, based on at least one of i) an expected transmission of the ISM band signals from the electronic device, and ii) an expected reception of the ISM band signals by the electronic device.

Embodiments of the computer-readable media can include one or more of the following features. In some embodiments, the functions further comprise: modifying the link status reports based on at least one of i) a priority of traffic carried by the MWS signals, and ii) a priority of traffic carried by the ISM band signals. In some embodiments, the link status reports include a channel condition value; and the functions further comprise modifying the channel condition value in the link status reports based on the expected transmission of the ISM band signals from the electronic device. In some embodiments, the link status reports include a traffic demand value, and the functions further comprise modifying the traffic demand value in the link status reports based on the expected reception of the ISM band signals by the electronic device. In some embodiments, the MWS signals comprise at least one of: Long Term Evolution (LTE) signals; and Worldwide Interoperability for Microwave Access (WiMAX) signals. In some embodiments, the one or more ISM band signals comprise at least one of: WiFi signals; Bluetooth signals; and ZigBee signals.

The details of one or more implementations are set forth in the accompanying drawings and the description below. Other features will be apparent from the description and drawings, and from the claims.

Figure 1:
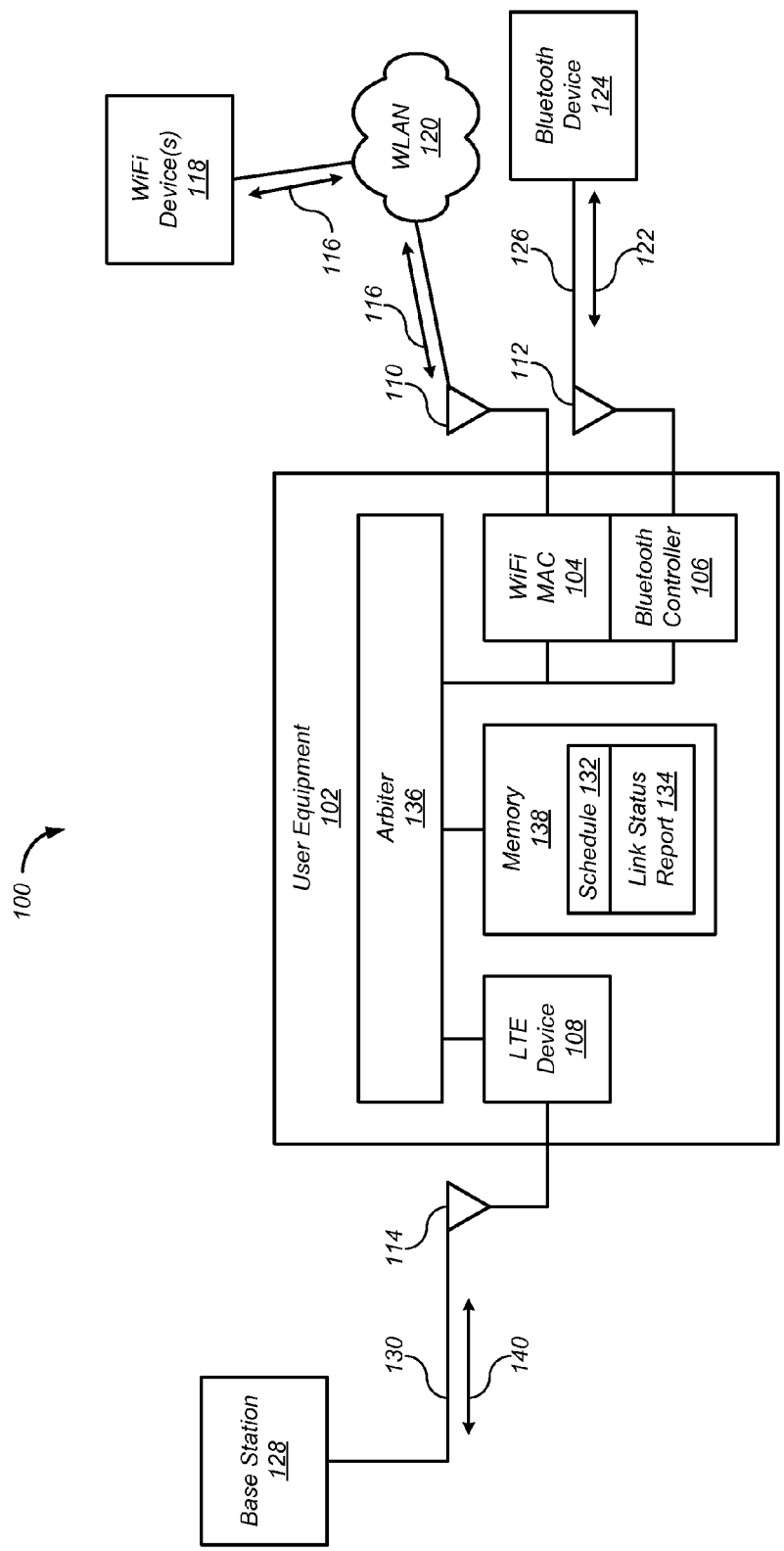
FIG. 1 shows elements of a communication system according to one embodiment.

The leading digit(s) of each reference numeral used in this specification indicates the number of the drawing in which the reference numeral first appears.

DESCRIPTION

Embodiments of the present disclosure provide coexistence among multiple wireless communication technologies through feedback spoofing. Several wireless communications technologies schedule transmissions to and from electronic devices, also referred to herein as "user equipment," based on feedback from the user equipment. According to the described embodiments, a user equipment modifies (that is, "spoofs") this feedback to affect the schedule in order to prevent interference between different wireless technologies.

This feedback generally takes the form of link status reports that include channel condition values, traffic demand values, and the like. One example of a channel condition value is the Channel Quality Indicator (CQI) employed by LTE (Long Term Evolution) and WiMAX systems. One example of a traffic demand value is the Buffer Status Report (BSR) employed by LTE systems. In the following description, various embodiments are described as using CQIs and/or BSRs. However, the present disclosure applies to any sort of link status report. Furthermore, while coexistence is described for Mobile Wireless Standards (MWS) transceivers and Industrial, Scientific and Medical (ISM) transceivers, the present disclosure applies to other sorts of wireless communication technologies as well.

FIG. 1 shows elements of a communication system 100 according to one embodiment. Although in the described embodiments the elements of communication system 100 are presented in one arrangement, other embodiments may feature other arrangements. For example, elements of communication system 100 can be implemented in hardware, software, or combinations thereof.

Referring to FIG. 1, communication system 100 includes a user equipment (UE) 102 capable of communications using multiple wireless technologies. The user equipment 102 can be implemented as any sort of electronic device capable of performing the functions described herein. For example, the user equipment 102 can be implemented as a smartphone, tablet computer, or the like. Elements of user equipment 102 can be implemented as one or more integrated circuits.

The user equipment 102 includes multiple transceivers employing different wireless technologies. In the example of FIG. 1, the transceivers include one Mobile Wireless Standards (MWS) transceiver and two Industrial, Scientific and Medical (ISM) band transceivers. In other embodiments, other numbers of transceivers and other combinations of wireless technologies can be employed instead. For example, the MWS transceivers can include Long Term Evolution (LTE) transceivers, Worldwide Interoperability for Microwave Access (WiMAX) transceivers, and the like, and the ISM band transceivers can include WiFi transceivers, Bluetooth transceivers, ZigBee transceivers, and the like. The ISM band equipment can also include receive-only devices such as global positioning system (GPS) receivers, frequency modulation (FM) radio receivers, and the like.

In the example of FIG. 1, the ISM band transceivers include a WiFi media access controller (MAC) 104 and a Bluetooth controller 106, and the MWS transceiver is implemented as an LTE device 108. Each transceiver communicates using one or more respective antennas. In particular, the WiFi MAC 104 uses one or more antennas 110, the Bluetooth controller 106 uses one or more antennas 112, and the LTE device 108 uses one or more antennas 114. In some embodiments, one or more of the antennas 110, 112, 114 can be combined.

Each transceiver communicates with one or more respective devices. Each ISM band transceiver transceives ISM band signals. Each MWS transceiver transceives MWS signals in accordance with a schedule. The schedule is based on link status reports transmitted by the MWS transceiver as part of the MWS signals. In the example of FIG. 1, the WiFi MAC 104 exchanges WiFi signals 116 with one or more WiFi devices 118 over a WiFi local-area network (WLAN) 120. The WLAN 120 can operate in ad-hoc mode or infrastructure mode. In ad-hoc mode, the WiFi devices 118 can include smartphones, other computers, and the like. In infrastructure mode, the WiFi devices 118 can include access points, and the like. The Bluetooth controller 106 exchanges Bluetooth signals 122 with a Bluetooth device 124 over a Bluetooth link 126. The Bluetooth device 124 can be a Bluetooth headset or the like. The LTE device 108 exchanges LTE signals 140 with a base station 128, also referred to as an LTE evolved Node B (eNB or eNodeB), over an LTE link 130. The LTE device 108 transceives the LTE signals 140 in accordance with the schedule 132. The schedule 132 is based on link status reports 134 transmitted by the LTE device 108 as part of the LTE signals 140.

The user equipment 102 also includes an arbiter 136 that schedules the WiFi MAC 104, the Bluetooth controller 106, and the LTE device 108. The arbiter 136 can be implemented as a processor. Processors according to various embodiments can be fabricated as one or more integrated circuits. The arbiter 136 receives the schedule 132 from the base station 128, and can store the schedule 132 in a memory 138. The arbiter 136 causes the LTE device 108 to transceive the LTE signals 140 in accordance with the schedule 132. The arbiter 136 also generates link status reports 134, and can store the link status reports 134 in the memory 138. The arbiter 136 causes the LTE device 108 to transmit the link status reports 134 to the base station 128 as part of the LTE signals 140. The base station 128 generates the schedules 132 based on the link status reports 134.

The link status reports 134 can include channel condition values such as Channel Quality Indicators (CQI), traffic demand values such as Buffer Status Report (BSR), and the like. In conventional systems, these values represent actual conditions. But in the described embodiments, in order to achieve coexistence between the wireless technologies implemented in the user equipment 102, the arbiter 136 modifies one or more of these values in order to affect the schedules 132. For example, the arbiter 136 can modify a channel condition value in a link status report 134 in response to an expected transmission of ISM band signals by one of the ISM band transceivers. This modification can be implemented so as to postpone a transmission of MWS signals to the user equipment 102 so the transmission of the ISM band signals does not interfere with reception of the MWS signals.

As another example, the arbiter 136 can modify a traffic demand value in a link status report 134 in response to an expected reception of ISM band signals by one of the ISM band transceivers. This modification can be implemented so as to postpone a transmission of MWS signals by the user equipment 102 so the transmission of the MWS signals does not interfere with reception of the ISM signals. The arbiter 136 can also modify the link status reports 134 based on other factors, such as priorities of the traffic carried by the MWS and ISM band signals, and the like. Specific implementations of these modifications are discussed in detail below.

Figure 2:
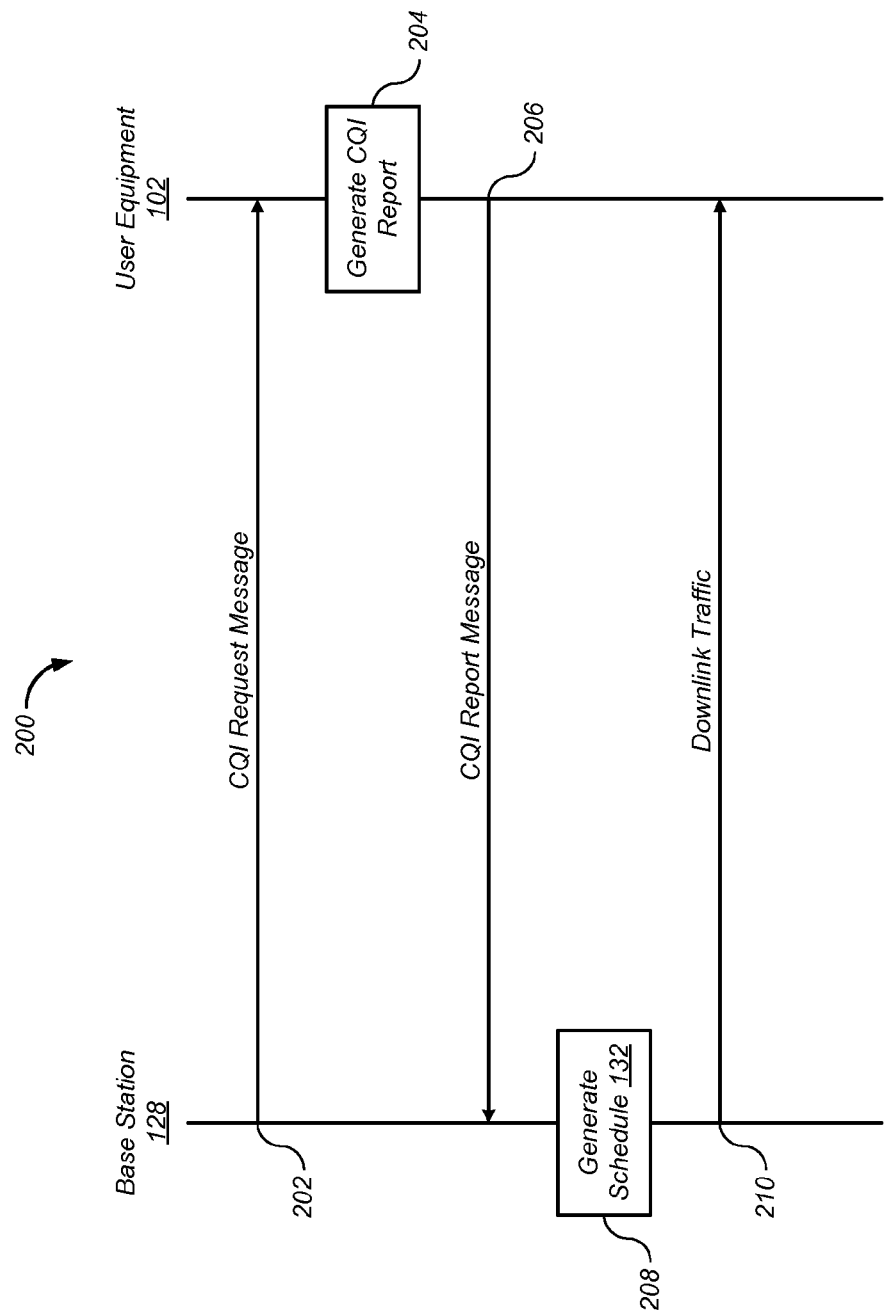
FIG. 2 shows a process for the communication system of FIG. 1 according to an embodiment where the arbiter modifies a Channel Quality Indicator (CQI) value in a link status report.

FIG. 2 shows a process 200 for the communication system 100 of FIG. 1 according to an embodiment where the arbiter 136 modifies a Channel Quality Indicator (CQI) value in a link status report 134. Although in the described embodiments the elements of process 200 are presented in one arrangement, other embodiments may feature other arrangements. For example, in various embodiments, some or all of the elements of process 200 can be executed in a different order, concurrently, and the like. Also some elements of process 200 may not be performed, and may not be executed immediately after each other.

Referring to FIG. 2, at 202, the base station 128 sends a CQI request message to the user equipment 102. As used herein, the term "message" generally refers to a wireless electronic signal representing a digital message. At 204, arbiter 136 generates a CQI report that includes one or more CQI values. The CQI values can include resource block values indicating wideband or subband indices, modulation and coding scheme (MCS) index values, transmission mode selection values, and the like. As part of generating the CQI report, arbiter 136 can modify one or more of the CQI values in response to an expected transmission of WiFi signals 116 by the WiFi MAC 104, or an expected transmission of Bluetooth signals 122 by Bluetooth controller 106. For example, the arbiter 136 can change the MCS index value to a low or zero value.

The arbiter 136 can base the modification on traffic priorities as well. The frequency resolution of the CQI measurement can be either wideband (that is, for the entire signal bandwidth) or narrowband (that is, for a single subband or a group of the subbands). In the case of a wideband CQI measurement, if the priority of the expected ISM transmit traffic exceeds a predetermined ISM transmit threshold priority, the user equipment 102 modifies the wideband CQI to have an MCS index that is lower than the calculated MCS index. The priority of the ISM traffic is calculated according to factors such as traffic type, quality of service (QoS), and the like. The ISM transmit threshold priority is programmable. The amount to decrease MCS index can depend on an estimate of the LTE receive traffic amount, priority, radio frequency (RF) filters, antenna isolation and band separation between ISM transmit and LTE receive, LTE receiver performance and capability, and the like. In addition, the LTE sounding signal power may be lowered, or the sounding signal may not be sent, according to the lower or zero MCS feedback.

In the case of a narrowband CQI measurement, if the priority of the expected ISM transit traffic exceeds a predetermined threshold ISM transmit priority, the user equipment 102 modifies the narrowband CQI to have an MCS index that is lower than the calculated MCS index for subbands that are close to the ISM band. Compared to the wideband case, this narrowband case can move the LTE receive band to subbands far from the ISM transmit band. The priority of the ISM traffic is calculated according to factors such as traffic type, QoS, and the like. The threshold ISM transmit priority is programmable. The amount to decrease the MCS index can depend on an estimate of LTE receive traffic amount, priority, RF filters, antenna isolation and band separation between ISM transmit and LTE receive, LTE receiver performance and capability, and the like.

In one embodiment, the arbiter 136 has knowledge of the collision pattern between the LTE receive and ISM transmit signals. Before a collision occurs, the arbiter 136 estimates the actual MCS based on the channel condition and the interference from the ISM transmit signals. The arbiter 136 can calibrate the MCS based on different configurations, for example depending on factors such as LTE transmission configuration, antenna isolation, filter specifications, and the like.

At 206, the arbiter 136 causes the LTE device 108 to send a CQI report message to the base station 128. The CQI report includes the modified CQI value(s). At 208, the base station 128 generates the schedule 132 based on the modified CQI value(s). However, note that LTE base stations 128 are not obligated to follow CQI feedback from the user equipment 102. At 210, the base station 128 sends downlink traffic to the user equipment 102, according to the schedule 132, at a time when the downlink traffic will not suffer from interference from the expected ISM transmit traffic.

Figure 3:
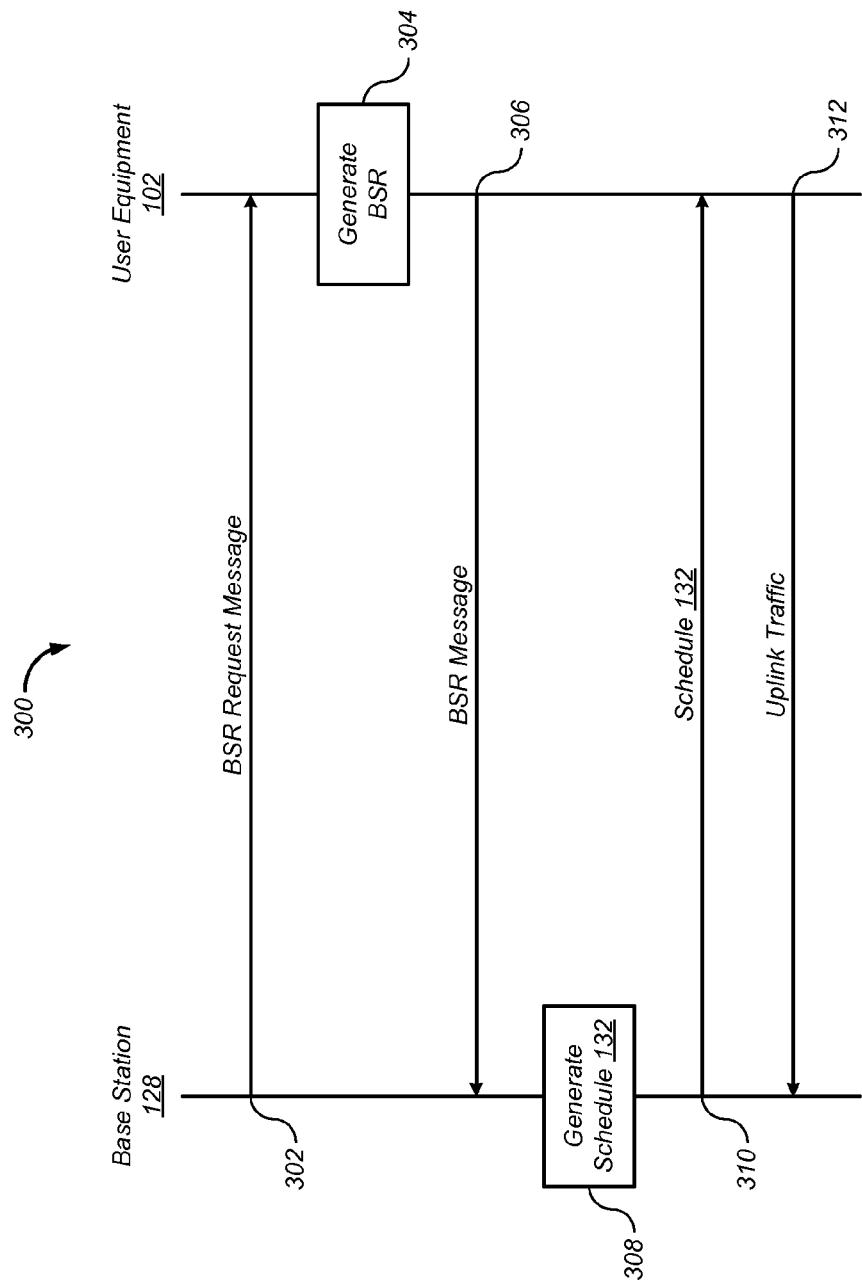
FIG. 3 shows a process for the communication system of FIG. 1 according to an embodiment where the arbiter modifies a Buffer Status Report (BSR) value in a link status report.

FIG. 3 shows a process 300 for the communication system 100 of FIG. 1 according to an embodiment where the arbiter 136 modifies a Buffer Status Report (BSR) value in a link status report 134. Although in the described embodiments the elements of process 300 are presented in one arrangement, other embodiments may feature other arrangements. For example, in various embodiments, some or all of the elements of process 300 can be executed in a different order, concurrently, and the like. Also some elements of process 300 may not be performed, and may not be executed immediately after each other.

Referring to FIG. 3, at 302, the base station 128 sends a BSR request message to the user equipment 102. However, user equipment 102 is not required to wait for a BSR request message, and can send a BSR message report without first receiving a BSR request message under certain conditions. At 304, arbiter 136 generates a BSR that includes one or more BSR values.

The BSR values can include a BSR traffic amount value that represents an amount of LTE uplink traffic buffered at user equipment 102 for transmission to the base station 128. The BSR traffic amount value is calculated in terms of aggregate traffic of logical channels in each logical channel group (LCG). Each LCG can be selected based on the priority and quality of service (QoS) of logical channels. A BSR can be triggered when 1) data are generated for uplink with a higher priority than any existing data (if any), or 2) a periodic BSR timer expires (for example every 5 subframes). As part of generating the BSR, arbiter 136 can modify one or more of the BSR values in response to an expected reception of WiFi signals 116 by the WiFi MAC 104, or an expected reception of Bluetooth signals 122 by Bluetooth controller 106. For example, the arbiter 136 can change the BSR traffic amount value to a lower or zero value.

The arbiter 136 can base the modification on traffic priorities as well. If the priority of the expected ISM receive traffic exceeds a predetermined ISM receive threshold priority, the user equipment 102 modifies the BSR traffic amount value to have a value that is lower than the calculated BSR traffic amount value. The priority of the ISM traffic is calculated according to factors such as traffic type, QoS, and the like. The ISM receive threshold priority is programmable. The amount to decrease the BSR traffic amount value can depend on the priority and QoS of the LTE transmit traffic, an estimate of the ISM traffic amount, priority, radio frequency (RF) filters, antenna isolation and band separation between ISM transmit and LTE receive, ISM receiver performance and capability, and the like. In some embodiments, the BSR traffic amount value is reduced less for high priority MWS traffic and/or high QoS MWS traffic than for low priority MWS traffic and/or low QoS MWS traffic. If the BSR traffic amount value is to be reduced to zero, it is not necessary to send a BSR message.

At 306, the arbiter 136 causes the LTE device 108 to send a BSR message to the base station 128. The BSR includes the modified BSR value(s). At 308, the base station 128 generates the schedule 132 based on the modified BSR value(s). At 310, the base station 128 sends the schedule 132, or a representation thereof, to the user equipment 102. At 312, the arbiter 136 causes the LTE device 108 to send uplink traffic to the base station 128, according to the schedule 132, at a time when ISM downlink traffic will not suffer from interference from the LTE uplink traffic.

Various embodiments feature one or more of the following advantages. From the viewpoint of an LTE base station 128, CQI spoofing saves the downlink resource from engaging in unsuccessful transactions resulting from potentially high interference with ISM transmissions from the user equipment 102. Thus the downlink resource can be used for other user equipment 102 resulting in better resource utilization efficiency for the base station 128. From the viewpoint of ISM devices in user equipment 102, BSR spoofing saves the ISM receive resource from unsuccessful receive transactions resulting from potentially high interference with LTE uplink packets. Note these advantages are achieved without changing existing 3GPP LTE standards.

In some embodiments, the user equipment 102 considers timers for an out-of-sync procedure that monitors the radio links between the user equipment 102 and the base station 128, such that the user equipment 102 will not lose the connection with the base station 128 due to spoofing. For example, the user equipment 102 may not continue CQI spoofing until timer T310 expires. According to the 3GPP LTE standard, timer T310 will be started upon N310 consecutive out-of-sync indications, which tells the user equipment 102 that the radio link quality is not good enough. Then, at the expiry of T310, the user equipment 102 either goes to radio resource control idle (RRC_idle) or tries to re-establish RRC connection, with the LTE device 108 turned off within 40 ms.

In some embodiments, when expecting ISM traffic, the user equipment 102 considers latency between feedback transmission and its reflection to eNB scheduling (for example, 8 ms for CQI feedback and downlink scheduling assignment for current 3GPP LTE FDD (frequency division duplexing) systems).

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. For example, the user equipment 102 can implement one or both of the embodiments of FIGS. 2 and 3. Accordingly, other implementations are within the scope of the following claims.

What is claimed is:

1. A device, comprising:
   a first transceiver configured to selectively transmit and receive first signals in a first frequency band according to a schedule, wherein the first signals include at least cellular signals;
   a second transceiver configured to selectively transmit and receive second signals in a second frequency band different from the first frequency band, wherein the second signals include at least WiFi signals; and
   an arbiter configured to (i) generate status reports indicating statuses of channels in the first frequency band and/or the second frequency band, (ii) receive the schedule as generated based on the statuses, and (iii) selectively modify the status reports based on
   an expected transmission and/or reception of the first signals by the first transceiver, and/or
   an expected transmission and/or reception of the second signals by the second transceiver.

2. The device of claim 1, wherein the first transceiver corresponds to a Mobile Wireless Standards transceiver.

3. The device of claim 1, wherein the first transceiver corresponds to a Long Term Evolution transceiver.

4. The device of claim 1, wherein the cellular signals correspond to Long Term Evolution signals transmitted in an un-licensed frequency band.

5. The device of claim 1, further comprising memory configured to store (i) the schedule and (ii) the status reports generated by the arbiter.

6. The device of claim 1, wherein the arbiter is further configured to (i) transmit the status reports to a base station and (ii) receive the schedule as generated by the base station in response to the status reports.

7. The device of claim 1, wherein the statuses indicated by the status reports include (i) Channel Quality Indicators that indicate conditions of the channels and/or (ii) traffic demand values indicating signal traffic on the channels.

8. The device of claim 7, wherein, to selectively modify the status reports, the arbiter is configured to modify the Channel Quality Indicators and/or the traffic demand values.

9. The device of claim 1, wherein, to selectively modify the status reports, the arbiter is further configured to modify the status reports based on (i) a priority associated with the first signals, and/or (ii) a priority associated with the second signals.

10. A method for operating a device, the method comprising:
   using a first transceiver, selectively transmitting and receiving first signals in a first frequency band according to a schedule, wherein the first signals include at least cellular signals;
   using a second transceiver, selectively transmitting and receiving second signals in a second frequency band different from the first frequency band, wherein the second signals include at least WiFi signals;
   generating status reports indicating statuses of channels in the first frequency band and/or the second frequency band;
   receiving the schedule as generated based on the statuses; and
   selectively modifying the status reports based on
      an expected transmission and/or reception of the first signals by the first transceiver, and/or
      an expected transmission and/or reception of the second signals by the second transceiver.

11. The method of claim 10, wherein using the first transceiver includes using a Mobile Wireless Standards transceiver.

12. The method of claim 10, wherein using the first transceiver includes using a Long Term Evolution transceiver.

13. The method of claim 10, wherein the cellular signals correspond to Long Term Evolution signals transmitted in an un-licensed frequency band.

14. The method of claim 10, further comprising storing, in memory, (i) the schedule and (ii) the status reports.

15. The method of claim 10, further comprising (i) transmitting the status reports to a base station and (ii) receiving the schedule as generated by the base station in response to the status reports.

16. The method of claim 10, wherein the statuses indicated by the status reports include (i) Channel Quality Indicators that indicate conditions of the channels and/or (ii) traffic demand values indicating signal traffic on the channels.

17. The method of claim 16, wherein selectively modifying the status reports includes modifying the Channel Quality Indicators and/or the traffic demand values.

18. The method of claim 10, wherein electively modifying the status reports includes modifying the status reports based on (i) a priority associated with the first signals, and/or (ii) a priority associated with the second signals.

* * * * *